United States Patent [19]
Miller et al.

[11] Patent Number: 5,421,060
[45] Date of Patent: Jun. 6, 1995

[54] SHRUB TRIMMER EXTENSION

[76] Inventors: Derek M. Miller; Bobby L. Miller, both of 270 Academy Ct., Gahanna, Ohio 43230

[21] Appl. No.: 49,365

[22] Filed: Apr. 21, 1993

[51] Int. Cl.⁶ ............................................. B25G 1/04
[52] U.S. Cl. ............................................... 16/114 R
[58] Field of Search ..................... 16/114 R, 115 R; 30/296.1; 294/58

[56] References Cited

U.S. PATENT DOCUMENTS

| | | | |
|---|---|---|---|
| 4,197,764 | 4/1980 | Auernhammer | 16/114 R |
| 4,638,562 | 1/1987 | Drake | 30/296.1 |
| 4,690,447 | 9/1987 | Adams | 294/58 |
| 5,228,202 | 7/1993 | Liao | 16/115 |

*Primary Examiner*—P. Austin Bradley
*Assistant Examiner*—Chuck Y. Mah

[57] ABSTRACT

An extension for positioning a powered shrub trimmer to reach and cut off the upper horizontal surfaces of high hedges which comprises a tubular elevating handle, an angulated cutter support base extending from the upper end of such elevating handle; means on such cutter support base to secure a powered shrub trimmer thereto; and a tubular brace extending from said elevating handle to the bottom of said cutter support base.

8 Claims, 4 Drawing Sheets

SHRUB TRIMMER EXTENSION

BACKGROUND OF THE INVENTION

1. Field of the Invention

The present invention relates to shrub trimmers and more particularly pertains to means which may be utilized to present a shrub trimmer operatively to the upper horizontal surfaces of high hedges or shrubs.

2. Description of the Prior Art

The use of extension handles for hedge or shrub trimmers is known in the prior art. More specifically, such extensions heretofore devised and utilized for the purpose of using hedge trimmers above an operator's head are known to consist basically of familiar, expected and obvious structural configurations, notwithstanding the myriad of designs encompassed by the crowded prior art which have been developed for the fulfillment of countless objectives and requirements. As shown in the art, specifically U.S. Pat. Nos. 4,976,031 and 5,070,576, such extensions have been axially in line with the blade of the cutter to which it is affixed.

As such these extensions work to raise the cutter or trimmer to a desired height, but only by the operator positioning himself at a substantial distance from the shrub being trimmed can the cutting blade begin to reach horizontally across the top of the shrub. Practically, this is not viable since leverage exerted by the weight of the trimmer in such a position makes it impossible for an operator to hold or control the trimmer. Consequently a ladder or the like to raise the operator is necessary to reach into and trim the horizontal surfaces of the top of the shrubs.

SUMMARY OF THE INVENTION

In view of the foregoing disadvantages inherent in the known types of shrub trimmer extensions now present in the prior art, the present invention provides an improved extension wherein the same can be utilized to hold a shrub trimmer operatively engaging the horizontal top surfaces of high shrubs. As such, the general purpose of the present invention, which will be described subsequently in greater detail, is to provide a new and improved shrub trimmer apparatus which has all the advantages of the prior art devices and none of the disadvantages.

To attain this, the present invention essentially comprises: an extension for positioning a powered shrub trimmer to reach and cut off the upper horizontal surfaces of high hedges which comprises a tubular elevating handle, an angulated cutter support base extending from the upper end of such elevating handle; means on such cutter support base to secure a powered shrub trimmer thereto; and a tubular brace extending from said elevating handle to the bottom of said cutter support base.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shrub trimmer extension which has all the advantages of the prior art devices and none of the disadvantages.

It is another object of the present invention to provide a new and improved shrub trimmer extension which may be easily and efficiently manufactured and marketed.

It is a further object of the present invention to provide a new and improved shrub trimmer extension which is of a durable and reliable construction.

An even further object of the present invention is to provide a new and improved shrub trimmer extension which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved shrub trimmer extension which provides in the apparatuses and methods of the prior art some of the advantages thereof, while simultaneously overcoming some of the disadvantages normally associated therewith.

Still another object of the present invention is to provide a new and improved shrub trimmer extension which permits reaching the top horizontal surfaces of high shrub or hedges.

Yet another object of the present invention is to provide a new and improved shrub trimmer extension which may be used with a variety of powered shrub trimmers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
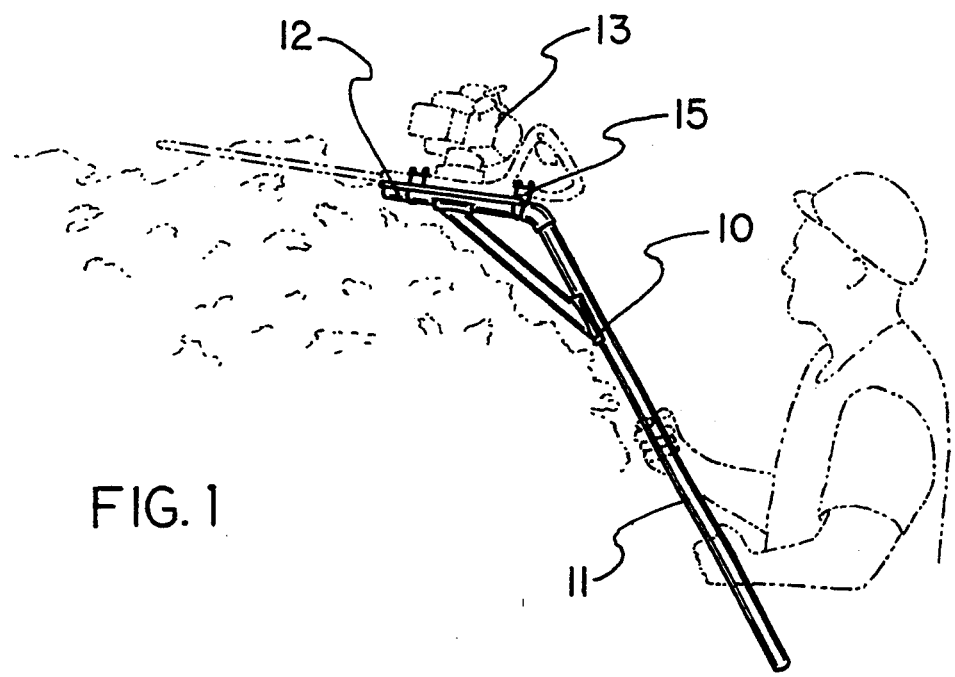
FIG. 1 is a perspective view of the shrub trimmer extension of the present invention being applied to a shrub.

With reference now to the drawings, and in particular to FIG. 1 thereof, a new and improved shrub trimmer extension embodying the principles and concepts of the present invention and generally designated by the reference numeral 10 will be described.

More specifically, it will be noted that the shrub trimmer extension 10 has an elevating handle member 11; a support base member 12 for a powered shrub trimmer 13 (shown in broken lines); and an angled brace member 14 extending between said handle member 11 and said base member 12. Mounted on the support base member 12 is a means 15 for securing a shrub hedge trimmer thereto. As shown in this FIG. 1, an operator, standing on the ground, can position the shrub trimmer above his head and move the same laterally into or over the top of the shrub being trimmed.

Figure 2:
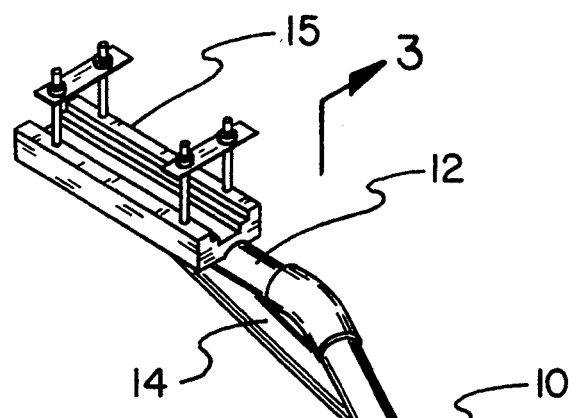
FIG. 2 is a perspective detail view of the device of the present invention.
Figure 2:
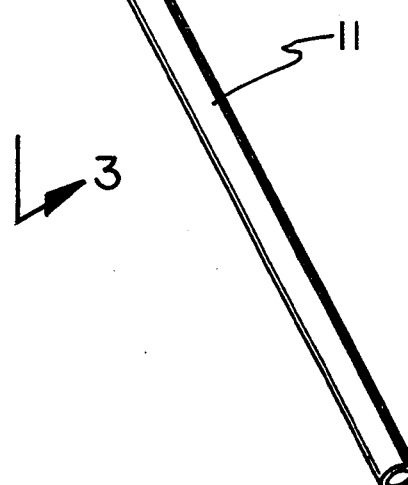

FIG. 2 shows the extension 10 in greater detail, illustrating that the support base member 12 extends from handle member 11 at an obtuse angle thereto. Consequently, the blade of the shrub trimmer (13 in FIG. 1) is likewise extending at an obtuse angle to handle member 11. The securing means 15 for such shrub trimmer, while more visible in this drawing, is detailed in FIGS. 3 and 4 described below.

Figure 3:
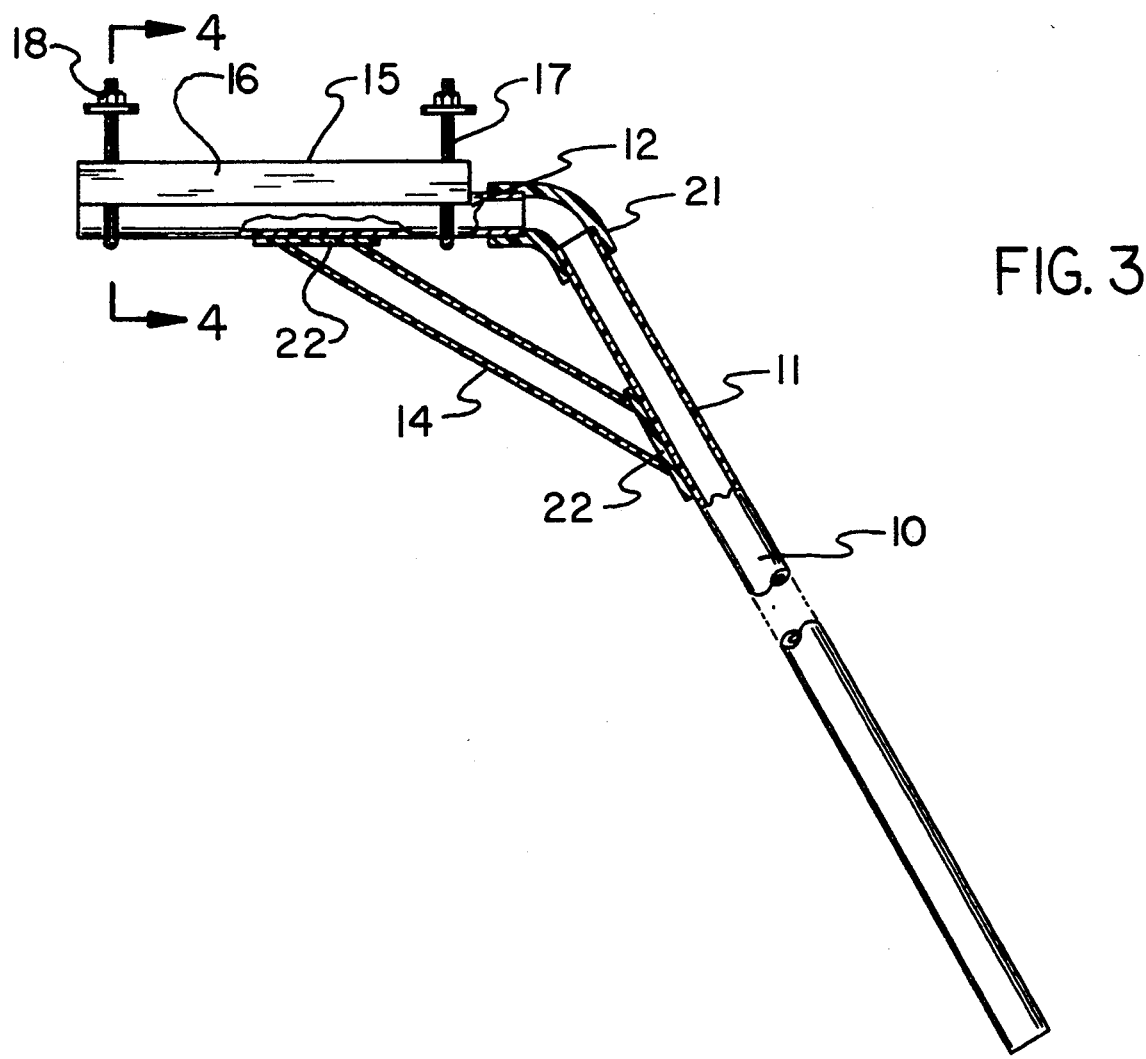
FIG. 3 is a sectional side plan view taken on line 3—3 of FIG. 2.
Figure 4:
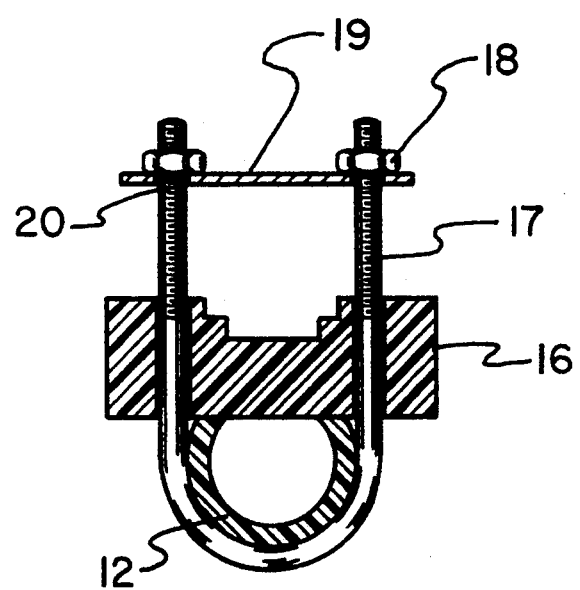
FIG. 4 is an enlarged sectional view of the shrub trimmer securing means taken on line 4—4 of FIG. 3.

In FIGS. 3 and 4, the securing means 15 is shown as consisting of a grooved flat plate member 16 adapted to seat the usual projecting flange of a shrub trimmer therein and a pair of threaded u-bolt clamps 17 adapted to fit around base support member 12, which is preferably formed from a rigid plastic tubing as is handle member 11, and through flat plate member 16 to firmly affix the assembly to support member 12 when the nuts 18 are threaded down on bolts 17. As best illustrated in FIGS. 2 and 4 of the drawings, the flat plate member includes a top side and a bottom side with the plate member additionally including an unlabeled center channel extending along a longitudinal length of the top side thereof. The channel is defined as having a first depth from the top side, a first width, and first and second sides. Further, the plate member includes both an unlabeled first lateral channel extending into the top side and along the first side of the center channel, and an unlabeled second lateral channel extending into the top side and along the second side of the channel. The first and second lateral channels are characterized as having a second depth from the top side of the plate member and a second width, wherein the first depth of the center channel is substantially greater than the second depth of both of the lateral channels. Also, the center channel is distinguished from the lateral channels wherein the first width of the center channel is substantially greater than the second width of the lateral channels. As is particularly shown in FIG. 4, a fastening plate 19 having bolt holes 20 therein is positioned with bolts 17 extending through such holes 20 and the plate 19 being adapted to extend across or through the frame of the shrub trimmer to secure it in place on support base member 12. Also as is shown in FIG. 3, the device 10 may be simply and economically assembled using conventional PVC tubing and fittings therefor. A standard 45° elbow fitting 21 is slip-fitted with the usual adhesive onto tubing forming base support member 12 and handle member 11. The brace member 14 uses similar tubing cut at angles as shown at 22 to fit snugly against the tubing forming said members to which it may be adhesively secured. Alternatively, brace member 14 may be held against such other members by conventional pipe clamp extending around each such engagement (not illustrated).

Figure 5:
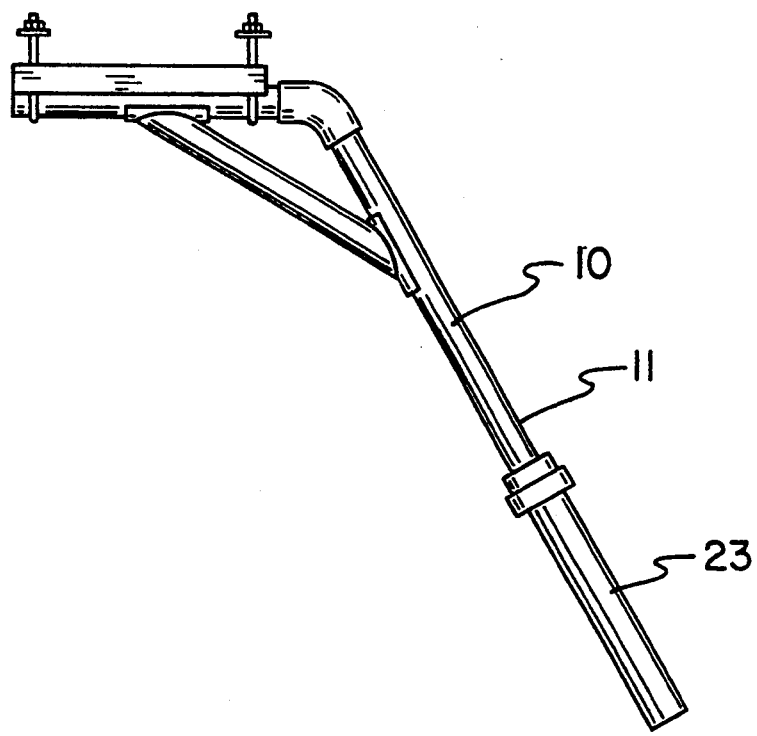
FIG. 5 is a side plan view of a modified version of the device of the present invention.
Figure 6:
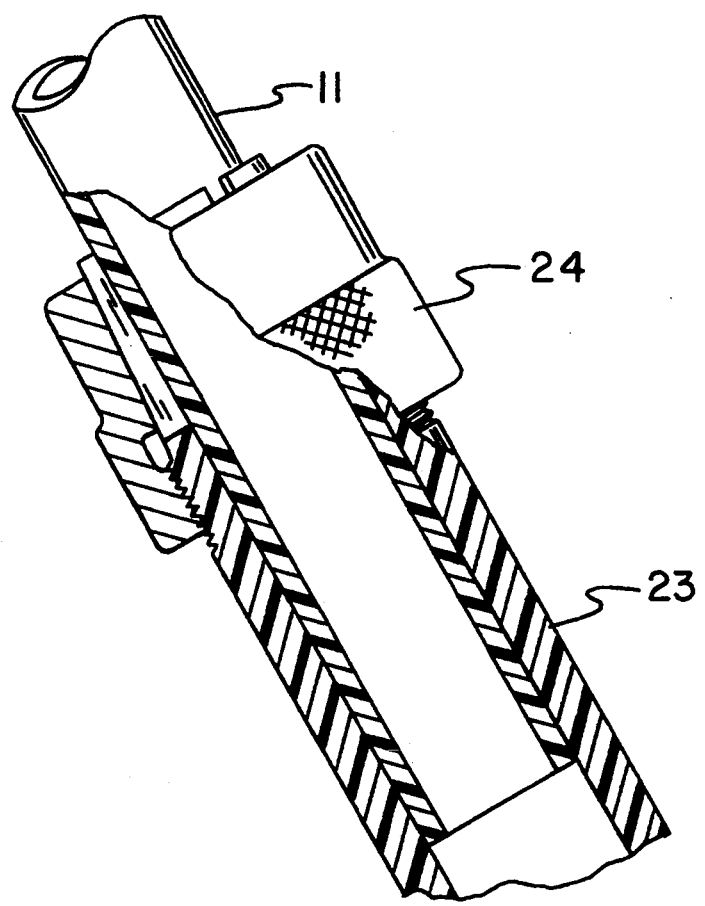
FIG. 6 is a partial sectional view taken on line 6—6 of FIG. 5.

FIG. 5 and 6 shows that the device 10 of the present invention may be fitted with a telescoping extension member 23 if desired. As shown in FIG. 6 such telescoping extension member 23 fits over handle member 11 and is adjustably positioned with respect thereto by an adjustable compression ring 24.

Figure 7:
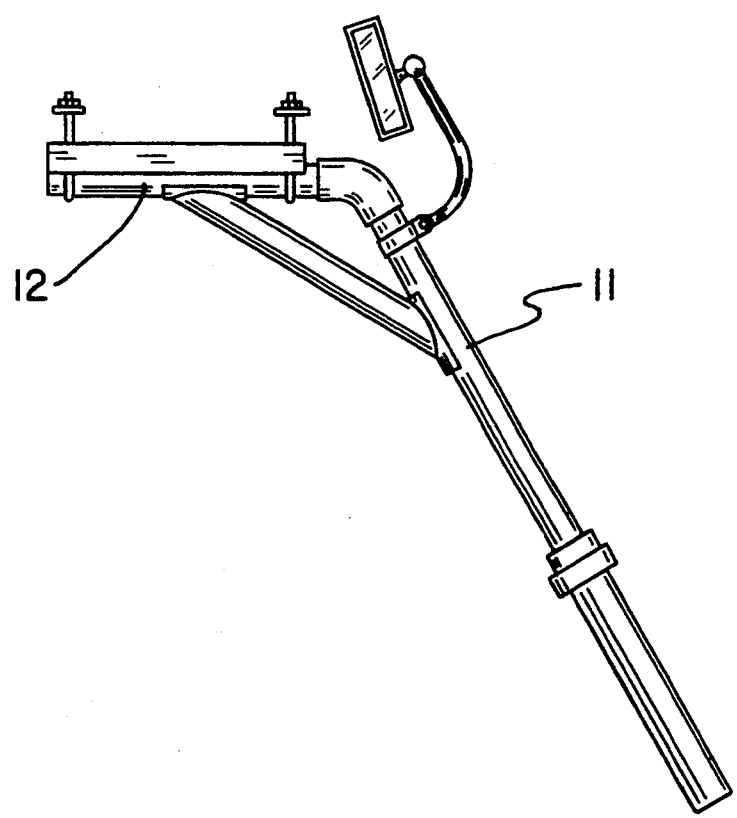
FIG. 7 is a perspective view showing a modified version of the invention.
Figure 8:
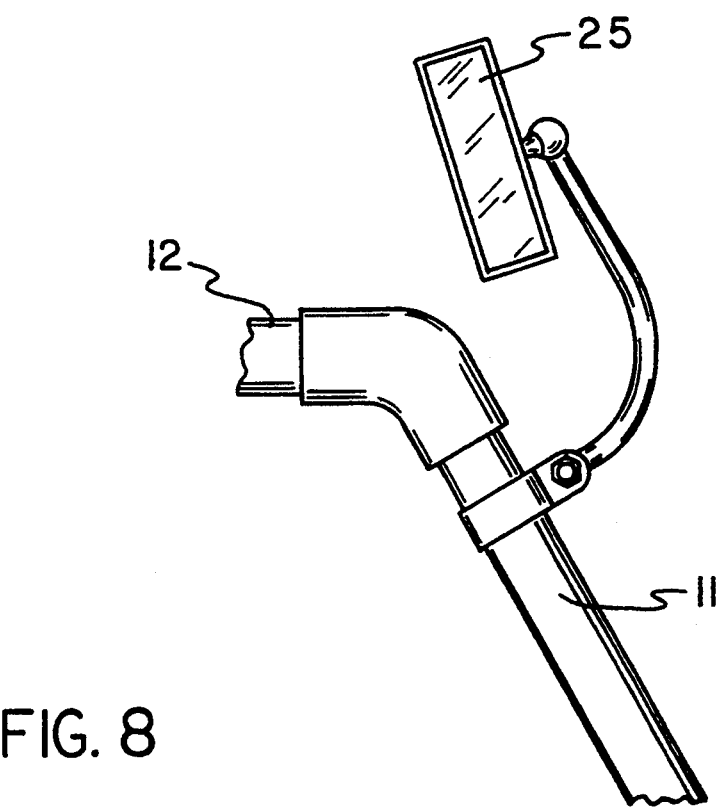
FIG. 8 is an enlarged perspective view of a portion of FIG. 7.

A useful adjunct to device 10 of the present invention is shown in FIG. 7 and 8 wherein an adjustable mirror 25 is mounted adjacent the connection between base support member 12 and handle member 11 to afford the operator a view of the surface being contacted by the shrub trimmer mounted on base support member 12.

Preferably, the obtuse angle between base member 12 and handle member 11 will be approximately 130° to 135°. Use of a 45° elbow as described above will produce approximately an obtuse angle of 135°.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A shrub trimmer extension device which comprises: an elongate tubular handle member; a second tubular base support member extending angularly from one end of said elongate handle member; and means on said second tubular base support member to securely fasten a power shrub trimmer thereto, said means to securely fasten a power shrub trimmer comprising a plate member coupled to said base support member, said plate member having a top side with a center channel extending along a longitudinal length of said top side thereof, with said power shrub trimmer being received along said top side of said plate member;

wherein a bracket member extends angularly between said elongated handle member and said base support member and is affixed to both said first-mentioned member and said second-mentioned member, and wherein said base support member extends at an angle of approximately 135 degrees from said handle member.

2. A device as in claim 1 wherein a telescoping extension is slideably affixed to said elongated handle member.

3. A device as in claim 2 wherein an adjustable mirror is affixed to said elongated handle member adjacent said base support member.

4. A shrub trimmer extension device comprising:

a substantially straight and elongated tubular handle member having a first end and a second end;

a substantially straight tubular base support member fixedly secured to said first end of said handle member and oriented at an oblique angle relative to said handle member;

a plate member having a top side and a bottom side, said plate member having a center channel extending along a longitudinal length of said top side, said channel having a first depth from said top side, a first width, and first and second sides thereof, with said plate member further having a first channel extending along said first side of said center channel, and a second channel extending along said second side of said channel, said first and second channels having a second depth from said top side and a second width, wherein said first depth of said center channel is substantially greater than said second depth of said channels, and further wherein said first width of said center channel is substantially greater than said second width of said channels, said plate member further having a first pair of spaced bolt holes extending therethrough, and a second pair of spaced bolt holes extending therethrough;

a first U-bolt clamp extending through said first pair of spaced bolt holes and about said support base member;

a second U-bolt clamp extending through said second pair of spaced bolt holes and about said support base member;

a first fastening plate having a pair of first fastening plate apertures, with said first U-bolt clamp extending through said first fastening plate apertures;

a second fastening plate having a pair of second fastening plate apertures, with said second U-bolt clamp extending through said second fastening plate apertures; and, a plurality of nuts threadably engaged to said U-bolt for simultaneously securing a power shrub trimmer to said plate member and said plate member to said support base member.

5. The shrub trimmer extension device of claim 4, and further comprising a brace member coupled to said support base member and said handle member.

6. The shrub trimmer extension device of claim 5, wherein said support base member has a substantially flat upper surface with said bottom side of said plate member positioned into abutting relation with said flat upper surface of said support base member.

7. The shrub trimmer extension device of claim 6, and further comprising a substantially straight and elongated tubular telescoping extension member, said extension member being substantially hollow and receiving at least a portion of said second end of said handle member therewithin; and a compression ring threadably engaged to said telescoping extension member for locking said handle member relative to said extension member.

8. The shrub trimmer extension device of claim 7, wherein said base support member is fixedly secured to said first end of said handle member by an elbow fitting, said elbow fitting having a first hollow end coupled to said first end of said handle member and a second hollow end coupled to an end of said base support member.

* * * * *